United States Patent
Bodner et al.

(10) Patent No.: US 10,050,649 B2
(45) Date of Patent: Aug. 14, 2018

(54) COMMUNICATION DEVICES AND METHODS

(71) Applicant: Infineon Technologies AG, Neubiberg (DE)

(72) Inventors: Christof Bodner, Villach (AT); Mario Motz, Wernberg (AT); Wolfgang Scherr, Villach Landskron (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 14/924,895

(22) Filed: Oct. 28, 2015

(65) Prior Publication Data
US 2016/0126986 A1 May 5, 2016

(30) Foreign Application Priority Data

Nov. 3, 2014 (DE) .......... 10 2014 115 967

(51) Int. Cl.
 *H04B 1/04* (2006.01)
(52) U.S. Cl.
 CPC .......... *H04B 1/0475* (2013.01); *H04B 1/0483* (2013.01)
(58) Field of Classification Search
 CPC .......... A61B 5/0205; G01B 7/14; G01B 7/16; G01B 9/02; G01R 9/00; G01R 31/02; G01R 33/07; G01R 35/00; G06F 15/00; H04B 1/04; H04B 1/10; H04B 1/0475; H04B 1/1027; H04B 1/707; H04B 7/00; H04B 15/00; H04L 25/08; H04L 27/26
 USPC .......... 324/202, 251, 654, 763; 375/148, 219, 375/296, 316, 349; 455/339, 422.1, 501; 600/484, 534; 702/79, 190
 See application file for complete search history.

(56) References Cited

U.S. PATENT DOCUMENTS

| 7,065,162 | B1* | 6/2006 | Sorrells | H03D 7/00 375/343 |
|---|---|---|---|---|
| 8,824,675 | B2* | 9/2014 | Nakano | H04N 21/4622 380/210 |
| 2001/0024475 | A1 | 9/2001 | Kumar | |
| 2004/0246022 | A1* | 12/2004 | Haulin | G01R 19/04 326/31 |
| 2004/0247021 | A1* | 12/2004 | Ishioka | H04B 1/70757 375/148 |
| 2007/0133711 | A1* | 6/2007 | Li | H04B 1/406 375/295 |
| 2010/0237890 | A1* | 9/2010 | Motz | G01D 3/08 324/750.3 |
| 2011/0066041 | A1* | 3/2011 | Pandia | A61B 5/113 600/484 |
| 2011/0276284 | A1* | 11/2011 | Johansson | H03M 1/0626 702/58 |
| 2012/0183025 | A1* | 7/2012 | Manickam | H04L 25/03057 375/222 |

(Continued)

FOREIGN PATENT DOCUMENTS

| CN | 102445661 A | 5/2012 |
|---|---|---|
| CN | 102680919 A | 9/2012 |

(Continued)

*Primary Examiner* — Shawkat M Ali
(74) *Attorney, Agent, or Firm* — Schiff Hardin LLP

(57) ABSTRACT

Devices and methods are provided where a first signal is provided via an interface, and a second signal is provided related to the suitability of the first signal for transmission via the interface.

18 Claims, 3 Drawing Sheets

(56) References Cited

U.S. PATENT DOCUMENTS

| | | |
|---|---|---|
| 2012/0239350 A1 | 9/2012 | Motz |
| 2013/0218498 A1* | 8/2013 | Droit .................... G01D 5/48 |
| | | 702/79 |
| 2013/0237260 A1* | 9/2013 | Lin ...................... H04B 1/525 |
| | | 455/501 |
| 2013/0271158 A1* | 10/2013 | Thoss .................... G01B 7/14 |
| | | 324/654 |
| 2014/0119485 A1* | 5/2014 | Seo ..................... H04L 25/08 |
| | | 375/349 |

FOREIGN PATENT DOCUMENTS

| | | |
|---|---|---|
| CN | 102982671 A | 3/2013 |
| CN | 103378836 A | 10/2013 |
| DE | 102012204221 A1 | 9/2012 |
| DE | 102014103556 A1 | 9/2014 |

* cited by examiner

COMMUNICATION DEVICES AND METHODS

TECHNICAL FIELD

The present application relates to communication devices like transmitters, receivers or transceivers and to corresponding methods.

BACKGROUND

Today, systems frequently use digital protocols and interfaces for data transmission between components, devices or elements. Such protocols or interfaces typically have a limited bandwidth regarding their transmission. For example, the bandwidth for a protocol or of an interface may be limited due to power considerations, cost considerations, electromagnetic compatibility considerations or other factors.

An example for such a system may be a sensor or other transmitter coupled to a control unit or other receiver. The sensor for example measures a physical signal, converts it to a digital value with a certain sampling rate and transmits it to a control unit using a transfer rate given by an interface and/or protocol used for the transmission.

The speed of such a system is in many cases limited by the interface used to transmit data via a communication channel. Assuming a certain transfer rate via the communication channel, a maximum bandwidth of the system according to the Nyquist-Shannon theorem may be at most half the transfer rate to avoid so-called aliasing effects. When aliasing effects occur, higher frequencies are "folded back" to the frequency band transmitted.

In less critical cases, such aliasing may just reduce signal quality (constituting essentially additional noise), but in other cases it may alter the signals such that errors in transmitted data or other faults may occur. For example, in cases where a data signal to be transmitted(e.g. a physical entity measured by a sensor device with digital transmitter) cannot be assumed to be band limited, such higher frequency components (above half the transmission frequency) may cause a wrong readout of sensor data.

Conventionally, so-called anti-aliasing filters (which may be essentially low-pass filters) are used to reduce or eliminate aliasing. Essentially, with such filters signal components above the "allowed" frequency band are filtered out or at least attenuated.

In some applications, it is required that a system has a low step response and thus requires a low latency time regarding the transmission of data to the control unit. In other words, a fast settling time of a signal to a final value may be required. However, an anti-aliasing filter may increase such a settling time (e.g. corresponding to an RC value of the filter), which may correspond to an increased latency as well.

To give an example, for example in a system a settling time of 100 µs is required as a so-called 5 τ-value, which essentially indicates that about 99.9% of the final signal value has to be reached after 100 µs. If such a requirement is to be implemented in an interface with a 400 µs update rate, the "sampling frequency" of the transmission would correspond to 2.5 kHz. This, to avoid aliasing effects, would require an anti-aliasing filter with a corner frequency lower than 1.25 kHz.

This filter defines basically the fastest possible settling time. Current realistic filter implementations which can be realized with reasonable efforts and costs and providing a useful step response, however, would result in a 5 τ-value much larger than the required 100 µs, depending on the chosen filter type and complexity and furthermore depending on the attenuation at the corner frequency to effectively prevent anti-aliasing problems.

Especially in safety-critical or mission-critical systems, where such redundant data transmission principles may be used, further margins may be desired to ensure a proper function and error tolerance of such a classic setup on the one hand, which will cause an even more reduced bandwidth and higher latency in the transmitted data on the other hand.

SUMMARY

A device as defined in claim 1, 12 or 13 is provided. Furthermore, a method as defined in claim 17 is provided. The dependent claims define further embodiments.

DETAILED DESCRIPTION

Figure 1:
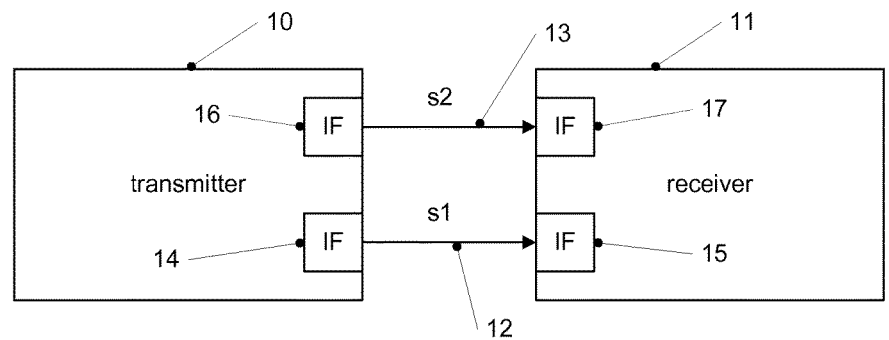
FIG. 1 is a block diagram illustrating a system according to an embodiment.

In the following, various embodiments will be described in detail referring to the attached drawings. The embodiments are to be regarded as illustrative examples only and are not to be construed as limiting. For example, while embodiments may be described as comprising a plurality of features or elements, in other embodiments some of these features or elements may be omitted and/or replaced by alternative features or elements. In yet other embodiments, additional features or elements may be provided.

Any connections or couplings shown in the drawings or described herein may be implemented as direct connections or couplings, i.e. connections or couplings without intervening elements, or indirect connections or couplings, i.e. connections or couplings with one or more intervening elements, as long as the general purpose of the connection or coupling, for example to transmit a certain kind of signal and/or to transmit a certain kind of information, is essentially maintained. Connections or couplings may be wire-based connections or couplings or may also be wireless connections or couplings, unless noted otherwise.

Furthermore, features from different embodiments may be combined to form additional embodiments.

Some embodiments relate to providing a signal to a transmission channel (for example a wireline or a wireless transmission channel) via a digital interface. A digital interface as used herein may relate to an interface which may transfer data via the transmission channel with a certain transfer rate. In some embodiments, a first signal may be provided by the interface. In addition, a second signal may be provided. The second signal may allow determining of a system-inherent error in the first signal. For example, in some embodiments, the second signal may indicate possible aliasing occurring in the first signal. In some embodiments, the first signal may be provided by providing a data signal for transmission via the interface without using an anti-aliasing filter.

In some embodiments, the second signal may be generated by examining properties of a signal to be supplied to the interface, e.g. the aforementioned data signal. For example, the second signal may be generated based on a portion of the signal above the Nyquist frequency.

In other embodiments, the second signal may be based on a filtered version of the data signal, for example filtered by an anti-aliasing filter. Therefore, in some embodiments by comparing the first signal with the second signal a receiver may determine if the first signal may be used or if errors occurred in the first signal for example due to aliasing.

In other embodiments, other techniques may apply.

Turning now to the figures, in FIG. 1 a system according to an embodiment is shown. The system of FIG. 1 comprises a transmitter 10 and a receiver 11. Transmitter 10 transmits data to receiver 11, for example in a wireless manner or in a wire-based manner.

It should be noted that transmitter 10 and receiver 11 in some cases may also be transceivers, i.e. data may in addition also be transmitted from receiver 11 to transmitter 10. This additional data transmission from receiver 11 to transmitter 10 may be implemented using techniques according to embodiments as described herein or also may be implemented in any conventional manner.

In some embodiments, transmitter 10 may be a sensor device measuring a physical quantity, for example a magnetic field, a pressure or the like, for transmitting digital data corresponding to the measured quantity to receiver 11. Receiver 11 may for example be a control unit which may be used to control other devices based on information received from the sensor.

In an embodiment, transmitter 10 transmits a first digital data signal s1 comprising for example payload data like sensor data to receiver 11 via a first communication channel 12, for example a wireline channel or a wireless channel. For outputting first signal s1 to communication channel 12, transmitter 10 uses an interface 14 which has a certain transfer rate. Receiver 11 receives first signal s1 via an interface 15.

Additionally, transmitter 10 transmits a second signal s2 via a second communication channel 13 using an interface 16. Receiver 11 receives second signal s2 via an interface 17. Signal s2 in embodiments comprises information related to possible system-inherent errors in the first signal s1, for example due to transmission via interface 14 and/or communication channel 12. For example, in some embodiments second signal s2 may indicate that a data signal provided to interface 14 to be transmitted as first signal s1 comprises components at a frequency above half the transfer rate of interface 14. In other embodiments, second signal s2 may be based on a filtered version of such a data signal sent. Other techniques may be used as well.

It should be noted that second communication channel 13 and first communication channel 12 may use the same or different physical medium, and interfaces 14 and 16 on the one hand and interfaces 15 and 17 on the other hand may each be implemented as a single interface or as a combined multi-channel interface. For example, signals s1 and s2 may be transmitted via a single communication channel via multiplexing or as two separated channels using a similar or different transmission methods and encodings (like current levels versus voltage levels, wireless versus wireline interface and so on).

Although further embodiments focus on digital transmission principles, it should be mentioned that techniques described herein are not necessarily limited to a digital transmission; instead, they may also be applied to analog transmissions or mixed analog and digital transmissions as well.

In such applications a sampling rate used in examples herein corresponds to a maximum bandwidth on an analog channel, determined by its physical properties. For example, in one embodiment, s1 may be transmitted as analog value with a high bandwidth on one physical channel 12 and s2 may be transmitted on a significantly band limited channel 13 using a digitally encoded transmission method. Furthermore, as example and not limited to such a configuration, channel 13 could provide an accurate "DC like" signal which can be also well protected against transmission errors using certain data integrity checks whether channel 12 can transfer fast signal changes a system may need to properly react on changes, although it might be easier distorted and less reliable and thus the receiver 46 will be able to react in case the signals s1 and s2 will be too far off a plausible range.

Examples for second signal s2 will be further described later on with reference to the embodiments of FIGS. 4 to 7. Prior to describing the embodiments of FIGS. 4 to 7 in detail, some basic concepts and techniques will first be illustrated with respect to FIGS. 2 and 3 to provide a better understanding of the embodiments which follow.

Figure 2:
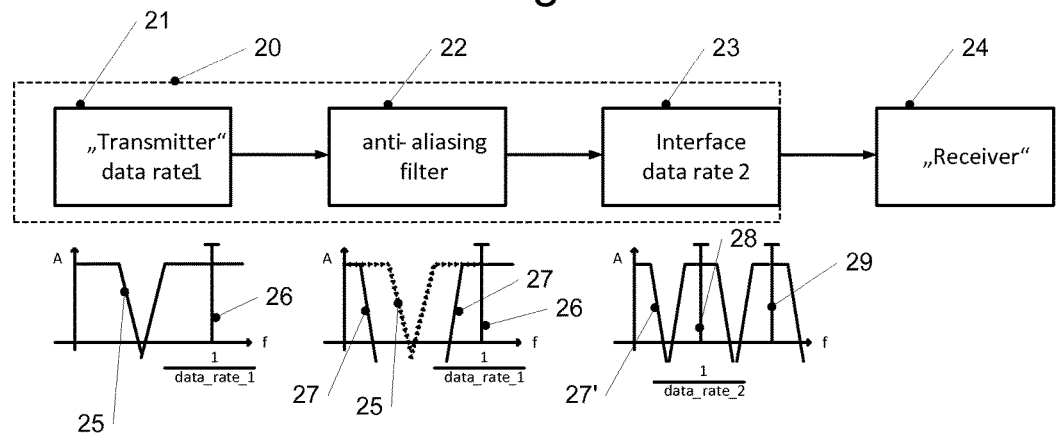
FIG. 2 is a diagram illustrating techniques applied in some embodiments.

FIG. 2 illustrates a system where data is transmitted from a transmitter 20 to a receiver 24 using an interface 23. A signal generating circuit 21 in the example of FIG. 2 generates a signal having a first data rate. For example, transmitter 20 may be a sensor, and circuit 21 may comprise an analog-to-digital converter converting a sensor output to a digital data signal with the first data rate.

The "allowable" frequency spectrum of such a signal is illustrated below the box indicating circuit 21 in FIG. 2. Here, a line 26 indicates a data frequency, denoted s1/data_rate_1 (in case the data rate is given as a time for each sample). In other words, the frequency indicated by line 26 corresponds for example to a sampling frequency of an analog-to-digital converter used. A curve 25 illustrates an "allowable spectrum", which extends up to half the frequency indicated by line 26. As also indicated in FIG. 25, further parts of the signal spectrum are formed by "mirroring" the spectrum around line 26 and multiples thereof.

In the example of FIG. 2, interface 23 has a second data frequency lower than the first data frequency of circuit 21, for example half the data frequency of circuit 21. To prevent aliasing, an anti-aliasing filter 22 is provided, which essentially modifies the spectrum from curve 25 to a curve 27. Essentially, anti-aliasing filter 22 may operate as a low-pass filter. Below the box indicating interface 23, the signal as transmitted via the communication channel is shown. Here, 28 indicates the data frequency (also referred to as transfer frequency herein) of interface 23, and a line 29 indicates twice the value. Signal 27 as output by anti-aliasing filter 22 is "folded" about lines 28 to form a signal spectrum as denoted by 27' in FIG. 2. In FIG. 2, the data output by interface 23 is then received by a receiver 24.

As already mentioned in the introductory portion, an anti-aliasing filter like filter 22 may prevent aliasing, but may introduce latencies like a slower settling time of signals.

Figure 3:
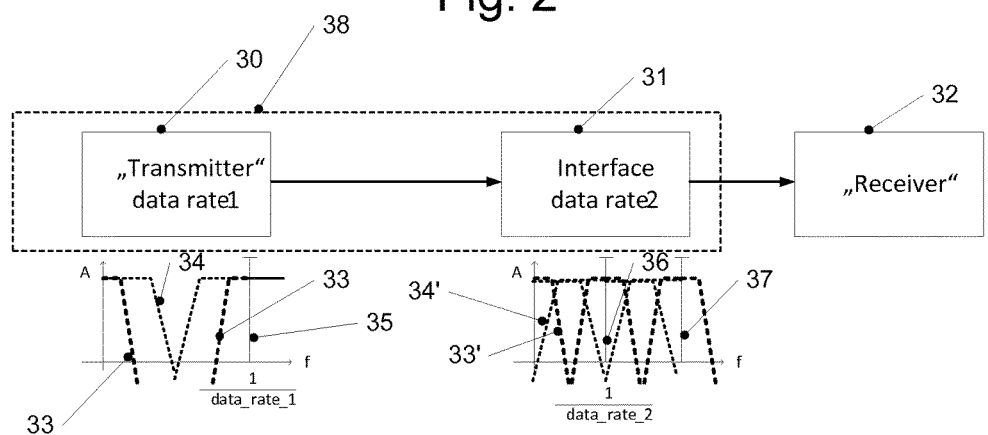
FIG. 3 is a diagram illustrating techniques applied in some embodiments.

To compare, FIG. 3 illustrates a case without an anti-aliasing filter. In case of FIG. 3, a transmitter 31 transmits data to a receiver 32. Transmitter 38 comprises a data generating circuit 30 which may be similar to data generating circuit 21 described with respect to FIG. 2. Below the box representing transmitter 3, example signals 33, 34 are shown. A line 35 illustrates a data frequency of transmitter 30. A signal 34 corresponds to a signal having a maximum frequency corresponding to half the data frequency 35. A curve 33 indicates a signal having a maximum frequency about one fourth of the sampling frequency. Data is transmitted via an interface 31 which again may have a transfer frequency which is half the sampling frequency of transmitter 30. A line 36 indicates the transfer frequency, while a line 37 indicates twice the transfer frequency.

As long as the signal output by transmitter 30 has only frequency components as indicated by curve 33, a signal 33' is transmitted to receiver 32, which allows a reconstruction of the original signal. If, however, the signal generated by circuit 30 has frequency components for example as indicated by curve 34, aliasing occurs, i.e. the "folding back" leads to overlaps, as indicated by curve 34'. This may make it impossible to reconstruct the original signal.

For example, in some cases circuit 30 may be designed to generate a signal within the frequency limits of curve 33. However, due to distortions, external influences etc. frequency components beyond that range, for example in the range indicated by curve 34, may occur, which in turn may lead to aliasing as indicated by curve 34'.

On the other hand, compared to FIG. 2 data transmission in FIG. 3 may have lower latency, as the anti-aliasing filter is omitted.

Taking the explanations of FIGS. 2 and 3 as a basis, next further embodiments will be described in more detail with reference to FIGS. 4 to 7.

Figure 4:
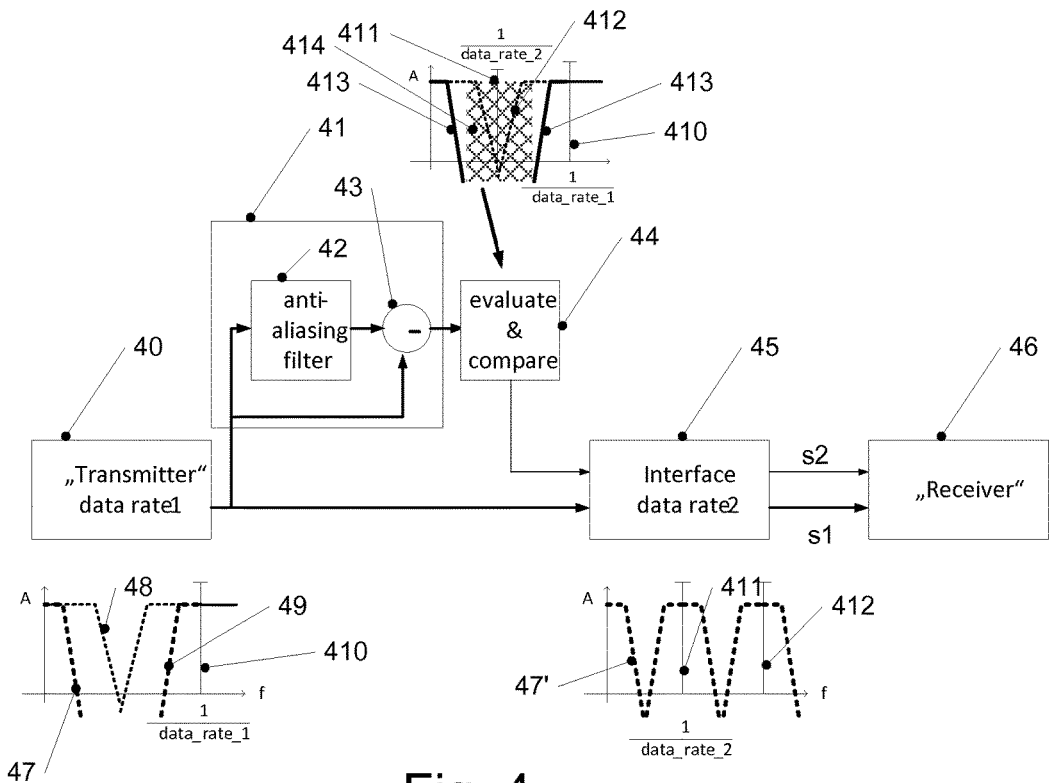
FIG. 4 is a block diagram illustrating a system according to an embodiment.

FIG. 4 illustrates an embodiment of a system where data is transmitted from a transmitter comprising elements 40 to 45 to a receiver 46. The transmitter comprises a signal generating circuit 40 which may be a circuit similar to circuit 21 of FIG. 2 or circuit 30 of FIG. 3. In other words, signal generating circuit 40 in the embodiment of FIG. 4 generates a data signal having a first data rate corresponding to a first data frequency (e.g. sampling frequency) as indicated by a line 410 in FIG. 4. Signal generating circuit 40 as mentioned previously may for example comprise a sensor or other data source and an analog-to-digital converter sampling at the first data frequency, but is not limited thereto.

Data thus generated is to be sent via an interface 45 operating at a second data frequency (transfer frequency). In an illustrative example, a transfer frequency associated with the second data rate may be half the sampling frequency of transmitter 40, as illustrated by a line 411. Therefore, the basic situation regarding data transmission corresponds to the one discussed with reference to FIGS. 2 and 3 above.

A line 47 indicates a frequency spectrum appropriate for the second data frequency, and 49 indicates the folded back spectrum. In other words, signals having a frequency range as indicated by 47 fulfill the Shannon-Nyquist criterion for the second data frequency, i.e. a maximum frequency is half the transfer frequency of interface 45. A line 48 illustrates a frequency spectrum appropriate for the first data frequency of signal generating circuit 40, which, however, as explained with respect to FIG. 3, without anti-aliasing filtering would lead to distortions when transmitted via interface 45 at the transfer frequency of interface 45.

In the embodiment of FIG. 4, the signal output by signal generating circuit 40 is forwarded to interface 45 to be transmitted as a signal s1 via a receiver 46. Furthermore, the signal output by signal generating circuit 40 is provided to an anti-aliasing filter 42 and to a first input of a subtractor 43. An output of anti-aliasing filter 42 is fed to a second input of subtractor 43. Therefore, subtractor 43 outputs a difference between the signal generated by signal generating circuit 40 and by this signal as filtered by anti-aliasing filter 42. As indicated by a box 41, the combination of anti-aliasing filter 42 and subtractor 43 in some embodiments essentially operates as a high-pass filter.

An output of subtractor 43 is evaluated by an evaluation and comparison circuit 44, which may for example compare the output of subtractor 43 with a threshold value. In an illustrative graph above the box forming evaluation and comparison circuit 44, to illustrate this a curve 413 corresponds to curves 47, 49 already described, and a curve 412 corresponds to curve 48 already described. A line 411 indicates the transfer frequency, and a line 410 indicates the data frequency of signal generation circuit 40. A cross-hatched area 414 illustrates a frequency range signal components in which produce an output of subtractor 43. In other words, an output of subtractor 43 may be a measure for an amount of energy in the frequency range indicated by area 414 (and possibly similar ranges about odd multiples of the transfer frequency), i.e. of energy in a frequency range critical for transmission via interface 45 as regards aliasing. As mentioned, the evaluation and comparison circuit may for example compare the output of subtractor 43 with a threshold, an exceeding of the threshold indicating for example a high likelihood that aliasing may lead to significant disturbances of transmission. In other embodiments, for example multiple comparisons with multiple thresholds may be provided, such that more detailed information regarding the amount of energy in the critical range may be output by evaluation and comparison circuit 43. It should be noted that in other embodiments block 41 may evaluate other signal properties of a signal to be transferred via interface 45, for example other properties which may affect the suitability of the signal to be transferred via interface 45.

A signal output by evaluation and comparison circuit 44 is transmitted via interface 43 as a signal s2. Signal s2 may be transferred on a different communication channel than signal s1 (for example on a different wireline), but may also be transferred on a same communication channel, for example on a same wireline, using multiplexing like time division multiplexing or frequency division multiplexing.

By receiving signal s2, receiver 46 may evaluate the reliability of signal s1. For example, when signal s2 indicates that little or no energy is present in range 414, signal s1 may be regarded as reliable, as no or only negligible aliasing may occur. On the other hand, if signal s2 indicates a high amount of data in range 414, receiver 46 may decide that signal s1 is not reliable and may for example simply discard signal s1.

A curve 47' in FIG. 4 illustrates the signal spectrum of signal s1 in case only a frequency range as indicated by 47 is used, i.e. no aliasing occurs. 414 indicates twice the transfer frequency 411.

In the embodiment of FIG. 4, as explained above receiver 46 by signal s2 simply receives a kind of warning indicating when for example aliasing threatens to occur.

Figure 5:
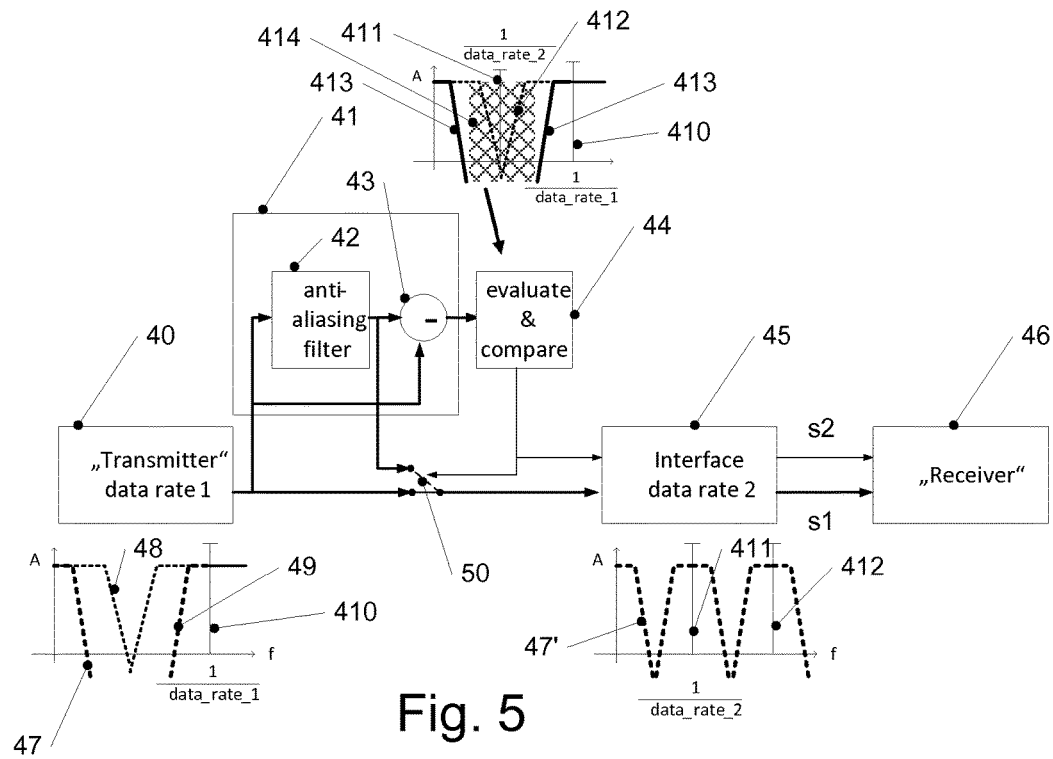
FIG. 5 is a block diagram illustrating a system according to an embodiment.
Figure 6:
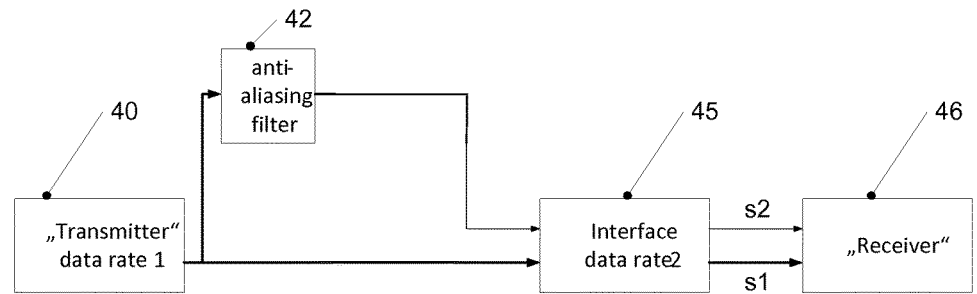
FIG. 6 is a block diagram illustrating a system according to an embodiment.

In other embodiments, besides or instead of sending a warning, other measures may be taken. Examples will be described next with reference to FIGS. 5 and 6. To avoid repetitions, in FIGS. 5 and 6 elements already described with reference to FIG. 4 bear the same reference numerals and will not be described again in detail. Instead, for a better understanding the following description will focus on differences between the embodiments of FIGS. 5 and 6 compared to the embodiment of FIG. 4. Any variations and modifications discussed with respect to FIG. 4 may also apply to the embodiments of FIG. 5 or 6 unless noted otherwise.

Similar to FIG. 4, FIG. 5 comprises elements 41, 44 to evaluate a signal energy or amplitude in a range 414 which may be indicative of an amount of aliasing which may occur when transmitting the signal output by signal generating circuit 40 via interface 45 as signal s1 without using an anti-aliasing filter. An output of evaluation and comparison circuit 44 similar to FIG. 4 is transmitted as signal s2 to receiver 46.

In contrast to the embodiment of FIG. 4, the embodiment of FIG. 5 comprises a switch 50 which is controlled by an output of evaluation and comparison circuit 44. Switch 50 selectively either couples an output of signal generation circuit 40 or an output of anti-aliasing filter 42 with interface 45 for transmission of a corresponding signal as signal s1. For example, when an energy or overall amplitude in range 414 is below a predetermined threshold, evaluation and comparison circuit 44 may control switch 50 to couple the output of signal generating circuit 40 directly with interface 45, so that similar to FIG. 4 the output of signal generating circuit 40 is transmitted as signal s1 without the use of an anti-aliasing filter. If the energy or amplitude of signals in range 414 is above the threshold, evaluation and comparison circuit 44 may control switch 50 to couple the output of anti-aliasing filter 42 with interface 45. In this case, therefore, the output of signal generation circuit 40 undergoes anti-aliasing filtering by anti-aliasing filter 42 prior to being transmitted as signal s1 via interface 45. In this way, in some embodiments anti-aliasing filtering is only performed when needed, for example when an energy or amplitude of signals in range 414 indicate that aliasing problems may occur when transmitting the signal via interface 45.

Via signal s2, receiver 46 then "knows" when anti-aliasing filter 42 is used for transmission of signal S1, for example due to potential aliasing problems.

In FIG. 6, a further embodiment of a system is illustrated. Again, elements already described with respect to FIG. 4 bear the same reference numerals as in FIG. 4, and they will not be described again in detail.

In the embodiment of FIG. 6, an output of signal generating circuit 40 is provided to interface 45 to be sent as a signal s1 to receiver 46, similar to the embodiment of FIG. 4. Furthermore, the output of signal generating circuit 40 is coupled with an input of anti-aliasing filter 42. In the embodiment of FIG. 6, an output of anti-aliasing filter 42 in some embodiments is not analyzed within a transmitter device, but provided to interface 45 to be sent as signal s2.

Therefore, in the embodiment of FIG. 6 the signal generated by signal generating circuit 40 is transmitted to receiver 46 both without prior anti-aliasing filtering (signal s1) and with anti-aliasing filtering (signal s2).

In such an embodiment, a receiver 46 may for example compare signal s2 to signal s1 to determine if signal s1 is subject to problems like aliasing. As long as this is not the case, the receiver may use signal s1 as it may have lower latency (due to the anti-aliasing filter being omitted). In case, however, e.g. data values reconstructed from signal s1 differ from data values reconstructed from signal s2, this may indicate aliasing problems, in which case signal s2 may be used for further processing in receiver 46 instead of signal s1. Therefore, in the embodiment of FIG. 6 signal s2 serves as signal providing information related to whether signal s1 is suitable for being transmitted via interface 45 to receiver 46.

It should be noted that embodiments discussed with reference to FIGS. 4 to 6 may be combined. For example, also in the embodiment of FIG. 6 an evaluation and comparison circuit like circuit 44 of FIG. 4 may be provided, and the result of the evaluation and comparison may for example be provided to receiver 46 as a third signal via interface 45.

In the embodiments of FIGS. 4 to 6, an output signal of a signal generating circuit is provided both to an interface (in FIG. 5 selectively via a switch 50) and to an anti-aliasing filter. In other embodiments, different signals may be provided to an anti-aliasing filter and directly to an interface, for example signals of two different sensors measuring essentially the same quantity.

The embodiment shown in FIG. 6 may be modified in a way, that instead of a single transmitter 40 multiple transmitters may be used, providing more two or more signals with similar data rates. In such an embodiment, at least one of the multiple transmitters may be connected to anti-aliasing filter 42 (or inherently implement such an anti-aliasing function) before connected to the interface 45, at least a second transmitter may be connected directly to the interface 45.

Figure 7:
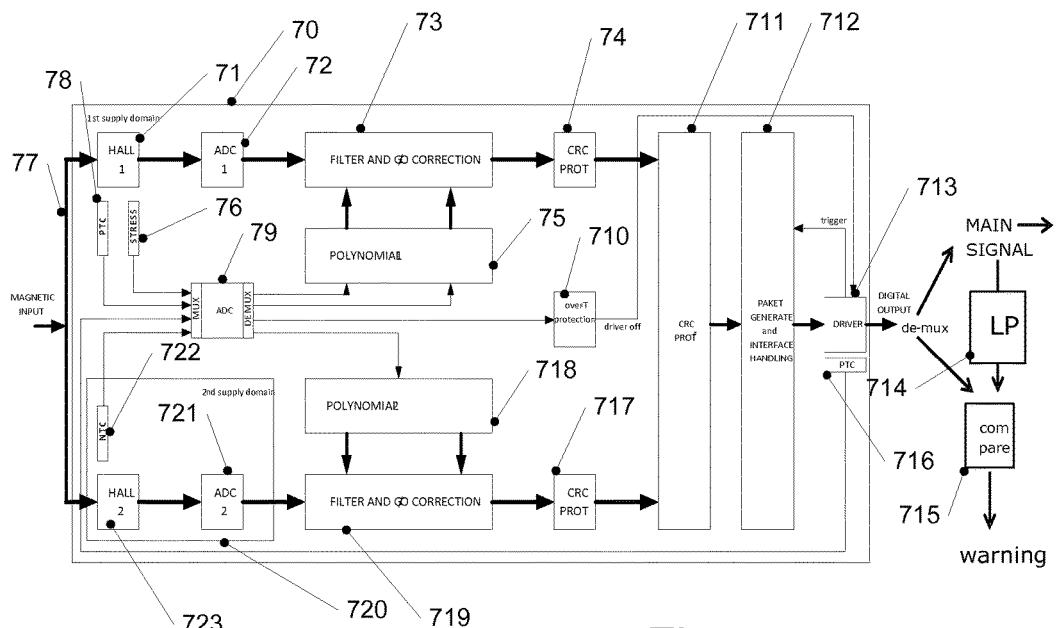
FIG. 7 is a block diagram illustrating a system according to an embodiment.

To give an example of such a setup with redundant data generation and transmission, a corresponding embodiment of a sensor device 70 is illustrated in FIG. 7.

In the embodiment of FIG. 7, a sensor device 70 comprises a first magnetic field sensor 71, for example a first Hall sensor, and a second magnetic field sensor 723, for example a second Hall sensor. In other embodiments, other magnetic field sensors than Hall sensors, for example sensors based on magnetoresistive effects (XMR sensors) may be provided. In yet other embodiments, other types of sensors or other devices generating signals for data transmission may be provided. This includes, but is not limited to, devices with redundant sensing, data processing and transmission.

An output signal of first Hall sensor 71 is provided to a first analog-to-digital converter 72, which may operate based on a first sampling frequency. Second Hall sensor 723 is coupled with a second analog-to-digital converter 721 which also operates based on a sampling frequency. In embodiments, the first sampling frequency of first analog-to-digital converter 72 may correspond to the sampling frequency of second analog-to-digital converter 721. In other embodiments, the sampling frequencies may differ.

First Hall sensor 71 together with first analog-to-digital converter 72 and/or second Hall sensor 723 together with second analog-to-digital converter 721 may be an example for a signal generating circuit like signal generating circuit 21, 30, or 40 described previously.

In the embodiment of FIG. 7, first Hall sensor 71 and first analog-to-digital converter 72 as well as further components described later are part of a first supply domain, while second Hall sensor 723 and second analog-to-digital converter 721 are part of a second supply domain 720, for example may have a supply voltage which is essentially independent from a supply voltage supplying for example first Hall sensor 71 and first analog-to-digital converter 72.

An output signal of first analog-to-digital converter 72 may be provided to a filter and gain/offset correction block 73 which may provide filtering of the digital signal output by analog-to-digital converter 72. As indicated by a box 75, filter 73 may be adapted (for example a filter polynomial may be adapted) based on an output signal of a block 79, which will be described later.

An output of filter 73 is provided to a CRC (Cyclic Redundancy Check) protection block 74 to add a checksum to the data. In other embodiments, addition of a checksum may be provided in a CRC protection block 711 together with a checksum for a signal received via a signal path from second analog-to-digital converter 721, which will be described next.

A digital output signal of second analog-to-digital converter 721 is provided to a filter and gain/offset correction block 719, which may be adjusted as indicated by a block 718, for example based on a second filter polynomial. Second filter polynomial 718 may be adjusted based on an output of block 79, which will be described later.

An output of filter and gain/offset correction block 719 is provided to a CRC protection block 717 followed by CRC protection block 711. Therefore, CRC protection, i.e. adding of a checksum like a cyclic redundancy check, may be performed separately for both signal path (from a DC 72 and from a DC 721) as indicated by block 74 and 717, and/or may be performed in a common block like block 711.

Blocks 73, 75, 74, 718, 719, 717 and 711 may be fully digital blocks and may for example be implemented by a correspondingly programmed digital signal processor, by hardware logic, or other types of software, hardware, firmware or combinations thereof.

Block 711 gathers data from both signal paths already mentioned and forwards it to a packet generation and interface handling block 712 which in the embodiment of FIG. 7 provides packetized data. CRC protection block 711 therefore also multiplexes data from block 74, 717, such that a single digital data stream is provided to block 712. In other embodiments, data may be provided in different form. The packets are then provided to a driver 713, which digitally outputs the packets and transfers them via a communication channel to a receiver.

Driver 713 may operate with a transfer frequency being lower than a sampling frequency of analog-to-digital converters 72, 720 and/or lower than a sampling frequency of the combined data stream output by block 711. Driver 713 is an example for an interface like interfaces 23, 31 or 45 explained previously. Therefore, without anti-alias filtering, aliasing may potentially occur.

In an embodiment, one of filters 73, 719 may provide anti-alias filtering, while the other one of filters 73, 719 does not provide anti-alias filtering. In such a case, driver 713 outputs, in multiplexed form, one signal which has undergone anti-alias filtering previously and another signal which has not undergone anti-alias filtering. By demultiplexing these signals and comparing the signal as indicated by a block 715, similar to what was explained for FIG. 6 a receiver may determine if the signal without anti-alias filtering (which may have a lower latency) is reliable. In some instances, the signal which has not undergone anti-alias filtering may be low-pass-filtered as indicated by a block 714 for better comparison of the signals. In other embodiments, other techniques may be used.

Therefore, in some respect FIG. 7 may be seen as an example implementation of the embodiment of FIG. 6, where a signal is sent both with anti-alias filtering and without anti-aliasing filtering. While two Hall sensors 71, 723 are provided in FIG. 7 which may provide increased functional safety, in other embodiments only a single Hall sensor and/or only a single analog-to-digital converter instead of converter 72, 721 may be provided. In some embodiments, block 73 and 79 may provide diversity.

Device 70 further includes some safety functions, which in other embodiments may be omitted. For example, temperature sensors 78, 722 and 716 may be provided. In some embodiments, sensor 78, 716 may be PTC sensors (Positive Temperature Coefficient), while sensor 722 may be an NTC sensor (Negative Temperature Coefficient) to provide diversity. In other embodiments, other types of sensors may be used. Furthermore, a stress sensor 76 measuring for example a stress on a chip on which device 70 is implemented is provided. Output signals of these sensors 78, 722, 716 and 76 are provided to block 79. Block 79 provides multiplexing, analog-to-digital conversion and demultiplexing of these signals, such that all of the sensor signals are converted to the digital domain using a single analog-to-digital converter. In other embodiments, also separate analog-to-digital converters may be provided, and multiplexing and demultiplexing may be omitted. However, as in many applications no high data rate is required for these signals, a single analog-to-digital converter may often be sufficient and more effective to implement in some embodiments than a plurality of analog-to-digital converters.

For example, block 75 may change filter and gain/offset correction block 73 in response to signals from sensors 78, 76 which may be located adjacent to first Hall sensor 71 to compensate temperature or stress influences on an output signal of first Hall sensor 71. Likewise, block 718 may adjust filter and gain/offset correction block 719 based on an output signal of sensor 722 which may be located adjacent to second Hall sensor 723, for example to compensate a temperature drift of second Hall sensor 723. Finally, an overtemperature protection block 710 may for example switch off driver 713 when temperature sensor 716, which may be located adjacent to driver 713, indicates for example that a temperature of driver 713 exceeds a predetermined threshold. In other embodiments, such safety functions may be omitted.

It should be noted instead of providing a signal including anti-aliasing filtering and a signal without via driver 713, in other embodiments an internal evaluation and comparison may be performed in device 70, similar to what was explained with reference to FIG. 4. Again, it is emphasized that features or elements from various embodiments may be combined to form further embodiments, and the embodiments shown serve illustrative purposes only.

Figure 8:
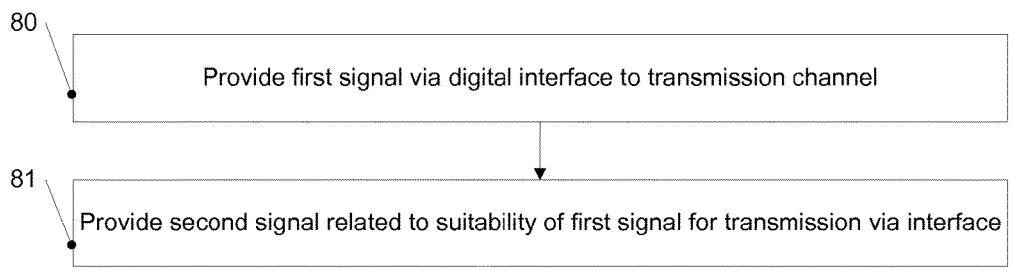
FIG. 8 is a flowchart illustrating a method according to an embodiment.

In FIG. 8, a flowchart illustrating a method according to an embodiment is illustrated. The method illustrated in FIG. 8 may for example be implemented in any of the devices discussed previously, but may also be implemented in other devices or systems using hardware, software, firmware or combinations thereof.

At 80 in FIG. 8, a first signal is provided by an interface with a transfer frequency. At 81, a second signal is provided, the second signal enabling a detection of system-inherent errors like aliasing in the first signal. For example, to form the first signal a data signal may be provided to the interface without anti-aliasing filtering, and the second signal may indicate if the data signal has frequency components which may lead to aliasing problems when transmitted using the interface. In other embodiments, the data signal may be selectively provided with or without anti-aliasing filtering to the interface, and the second signal may indicate if the data signal is provided with anti-aliasing filtering or not. In yet other embodiments, the data signal may be provided to the interface without anti-aliasing filtering, and the second signal may be based on the data signal with anti-aliasing filtering. In some embodiments, the data signal may be a digital signal having a sampling frequency greater than the transfer frequency of the interface. Other techniques may also be employed.

In some of the embodiments described above, a signal generating circuit, for example signal generating circuit 40, provides a digital signal having a sampling frequency greater than a transfer frequency of an interface. In other embodiments, other relationships may apply. Embodiments may also use more than one signal generation circuits instead of using one signal generation circuit 40. In yet other embodiments, instead of a digital signal having a sampling frequency, a signal generation circuit may provide an analog signal to be provided via an interface having a transfer rate. In such embodiments, similar considerations and techniques may be applied as described above, as an analog signal in some respect essentially may be regarded as a signal having a continuous frequency spectrum, i.e. essentially an infinite sampling frequency. Also here, for example using a filter like a high-pass filter, frequency components above half a transfer frequency of an interface may be determined, and depending on the determination, for example a warning signal may be generated indicating that aliasing may occur, or anti-aliasing filtering may be applied.

The invention claimed is:

1. A device, comprising:
    a data generating circuit adapted to generate a data signal;
    a digital interface circuit having a transfer frequency adapted to receive the data signal and to transmit a first signal based on the data signal;
    a filter circuit adapted to filter the data signal to remove predetermined frequency components of the data signal to provide a filtered signal,
    wherein the digital interface circuit is further adapted to transmit a second signal based on the filtered signal.

2. The device of claim 1, wherein the filter circuit comprises an anti-aliasing filter adapted to the transfer frequency of the digital interface.

3. The device of claim 2, wherein the filter circuit further comprises a subtractor adapted to output a difference between the data signal and an output signal of the anti-aliasing filter.

4. The device of claim 2, wherein the device further is adapted to selectively provide the data signal or an output signal of the anti-aliasing filter to the interface circuit.

5. The device of claim 4, wherein the second signal is indicative of whether the data signal or the output signal is provided to the interface circuit.

6. The device of claim 2, wherein the device is further adapted to provide an output signal of the anti-aliasing filter as the filtered signal to the interface circuit for transmission as the second signal.

7. The device of claims 1, wherein the predetermined frequency components comprise frequency components outside a frequency range susceptible to aliasing when transmitted by the digital interface circuit, and wherein the device is adapted to form the second signal based on a magnitude of frequency components of the filtered signal.

8. The device of claim 1, wherein the second signal indicates aliasing occurring in the first signal.

9. The device of claim 1, wherein the data signal is one of an analog signal or a digital signal having a sampling frequency.

10. The device of claim 9, wherein the transfer frequency is lower than the sampling frequency.

11. The device of claim 1, wherein the device is adapted to provide the data signal to the interface without anti-aliasing filtering.

12. A device, comprising:
    an interface circuit adapted to transmit a digital first signal and a second signal to a further device, the device being configured to convert an analog signal into the digital first signal,
    wherein the second signal comprises information to enable the further device to determine that aliasing occurred in the conversion of the analog signal to the first digital signal.

13. A system, comprising:
    a first device comprising:
        a data generating circuit adapted to generate a data signal;
        a digital interface circuit having a transfer frequency adapted to receive the data signal and to transmit a first signal based on the data signal;
        a filter circuit adapted to filter the data signal to remove predetermined frequency components of the data signal to provide a filtered signal,
        wherein the digital interface circuit is further adapted to transmit a second signal based on the filtered signal, and
    a second device comprising:
        a receiver circuit adapted to receive a first signal and a second signal,
        wherein the second device is adapted to determine aliasing in the first signal at least based on the second signal,
    wherein the first device is coupled with the second device via at least one transmission channel.

14. A method, comprising:
    processing in a first device an analog data signal to provide a first digital signal;
    providing in the first device a second signal based on the analog data signal;
    transferring the first digital signal and the second signal from the first device to a second device; and
    determining in the second device, based on the second signal, a system-inherent error caused by the processing of the analog signal in the first device.

15. The method of claim 14,
    wherein the processing comprises a digital transmission with a transfer frequency, and
    wherein the system-inherent error comprises aliasing.

16. The method of claim 15, wherein providing the second signal comprises filtering the data signal.

17. The method of claim 16, wherein the filtering comprises anti-aliasing filtering.

18. The method of claim 14, wherein the determining comprises comparing the second signal with the first signal.

* * * * *